US011457000B2

(12) United States Patent
Nakata et al.

(10) Patent No.: US 11,457,000 B2
(45) Date of Patent: Sep. 27, 2022

(54) INFORMATION INTERMEDIATING APPARATUS, INFORMATION PROVIDING APPARATUS, AND INFORMATION ACQUIRING APPARATUS

(71) Applicants: DENSO CORPORATION, Kariya (JP); TOHOKU UNIVERSITY, Sendai (JP)

(72) Inventors: Tsuneo Nakata, Kariya (JP); Naoki Iwata, Kariya (JP); Masao Sakai, Sendai (JP); Masayuki Fukumitsu, Ebetsu (JP); Shingo Hasegawa, Sendai (JP); Shuji Isobe, Sendai (JP); Junya Iwazaki, Sendai (JP); Eisuke Koizumi, Sendai (JP)

(73) Assignees: DENSO CORPORATION, Kariya (JP); TOHOKU UNIVERSITY, Sendai (JP)

( * ) Notice: Subject to any disclaimer, the term of this patent is extended or adjusted under 35 U.S.C. 154(b) by 103 days.

(21) Appl. No.: 16/511,244

(22) Filed: Jul. 15, 2019

(65) Prior Publication Data
US 2020/0028834 A1 Jan. 23, 2020

(30) Foreign Application Priority Data
Jul. 17, 2018 (JP) .............................. JP2018-134509

(51) Int. Cl.
*H04L 29/06* (2006.01)
*H04L 9/40* (2022.01)
*H04L 9/06* (2006.01)
*H04L 9/08* (2006.01)
*H04W 4/48* (2018.01)

(52) U.S. Cl.
CPC ........ *H04L 63/0471* (2013.01); *H04L 9/0643* (2013.01); *H04L 9/085* (2013.01); *H04W 4/48* (2018.02)

(58) Field of Classification Search
CPC ... H04L 63/0471; H04L 9/0643; H04L 9/085; H04L 63/0435; H04L 63/061; H04L 9/3239; H04W 4/48
See application file for complete search history.

(56) References Cited

U.S. PATENT DOCUMENTS 6,115,699 A * 9/2000 Hardjono .............. G06F 21/606
380/283
6,853,988 B1 * 2/2005 Dickinson .............. G06Q 20/02
705/75

(Continued)

FOREIGN PATENT DOCUMENTS

| JP | 2002-150193 A | 5/2002 |
| JP | 2013-157765 A | 8/2013 |

OTHER PUBLICATIONS

Sybase, "Objects and controls, PowerBuilder", 11.5 (Year: 2008).*

*Primary Examiner* — Joseph P Hirl
*Assistant Examiner* — Chi D Nguy
(74) *Attorney, Agent, or Firm* — Maschoff Brennan

(57) ABSTRACT

An information intermediating apparatus in an information transaction system including an information providing apparatus, an information acquiring apparatus and the information intermediating apparatus connected to a communication network, includes: a first receiver that receives second information, of first and second information necessary for restoring transaction object information, and first feature information indicating a feature of the first information; a second receiver that receives second feature information from the information acquiring apparatus, the second feature information being calculated from the first information transmitted to the information acquiring apparatus from the information providing apparatus; a feature information determination unit that determines whether an identity is present between the first feature information and the second (Continued)

feature information; and a transmitter that transmits the second information to the information acquiring apparatus, when the feature information determination unit determines that the identity is present between the first feature information and the second feature information.

16 Claims, 6 Drawing Sheets

(56) References Cited

U.S. PATENT DOCUMENTS

| | | | | |
|---|---|---|---|---|
| 7,181,017 | B1* | 2/2007 | Nagel | H04L 9/0825 |
| | | | | 380/282 |
| 9,407,440 | B2* | 8/2016 | Roth | H04L 9/0894 |
| 2003/0028494 | A1* | 2/2003 | King | G06Q 20/3829 |
| | | | | 705/71 |
| 2004/0039692 | A1* | 2/2004 | Shields | G06Q 20/14 |
| | | | | 705/39 |
| 2010/0017615 | A1* | 1/2010 | Boesgaard Sorensen | |
| | | | | G06F 21/64 |
| | | | | 713/176 |
| 2012/0128151 | A1* | 5/2012 | Boehm | H04N 21/235 |
| | | | | 380/42 |
| 2013/0007242 | A1* | 1/2013 | Wang | G06Q 20/00 |
| | | | | 709/223 |
| 2018/0341666 | A1* | 11/2018 | Lee | G06F 16/1873 |
| 2019/0066237 | A1* | 2/2019 | Haneda | G06Q 20/18 |
| 2019/0347438 | A1* | 11/2019 | Hamlin | G06F 21/6218 |

* cited by examiner (a)

(b)

(c)

(d)

(e)

INFORMATION INTERMEDIATING APPARATUS, INFORMATION PROVIDING APPARATUS, AND INFORMATION ACQUIRING APPARATUS

CROSS-REFERENCE TO RELATED APPLICATION

This application is based on and claims the benefit of priority from earlier Japanese Patent Application No. 2018-134509 filed Jul. 17, 2018, the description of which is incorporated herein by reference.

BACKGROUND

Technical Field

The present disclosure relates to an information intermediating apparatus, an information providing apparatus and an information acquiring apparatus, capable of avoiding information leakage and unfair acts or fraud by a party when information such as digital contents are transacted among apparatuses connected via the communication network.

Description of the Related Art

A transaction of the digital contents via the communication network has been increasing because of growth of the internet technology and growth of development in various advanced terminal equipment. However, as the transactions increase, problems with the transactions increase.

In this respect, for example, a technique discloses a distribution and a settlement system for electronic commerce using the internet, in which confirmation/authentication act in the electronic commerce occurred between the seller and buyers are collected as data and the collected data is registered in the date authentication system.

SUMMARY

The present disclosure provides an intermediating apparatus that reduces a risk of information leakage from the intermediating apparatus.

The information intermediating apparatus according to the present disclosure is configured as an information intermediating apparatus in an information transaction system that is composed of an information providing apparatus, an information acquiring apparatus and the information intermediating apparatus which are connected to a communication network.

DETAILED DESCRIPTION OF PREFERRED EMBODIMENT

Hereinafter, with reference to the drawings, embodiments of the present disclosure will be described.

The present disclosure refers to the invention recited in the claims and is not limited to the following embodiment part. Terms in single quotations refer to terms used in claims and are not limited to the following embodiments. Configurations and methods described in the dependent claims, configurations and methods of the embodiments corresponding to those described in the dependent claims, and configurations and methods which are recited in the scope of the claims but described only in the embodiments are modifications of the invention. The configurations and methods described in the embodiments which are regarded as broader than the scope of the claims are considered as modifications of the invention. In any cases, when describing those configurations and methods in the independent claims, those configurations and methods are necessary configurations and methods. Effects described in the embodiments are obtained in the configuration of the embodiments as an example of the present disclosure. In the case where a plurality of embodiments are present in the present disclosure, configurations in the respective embodiments can be combined between the respective embodiments. For example, a configuration disclosed in one embodiment may be combined with those disclosed in other embodiments. Further, configurations disclosed in the respective embodiments can be combined.

Figure 1:
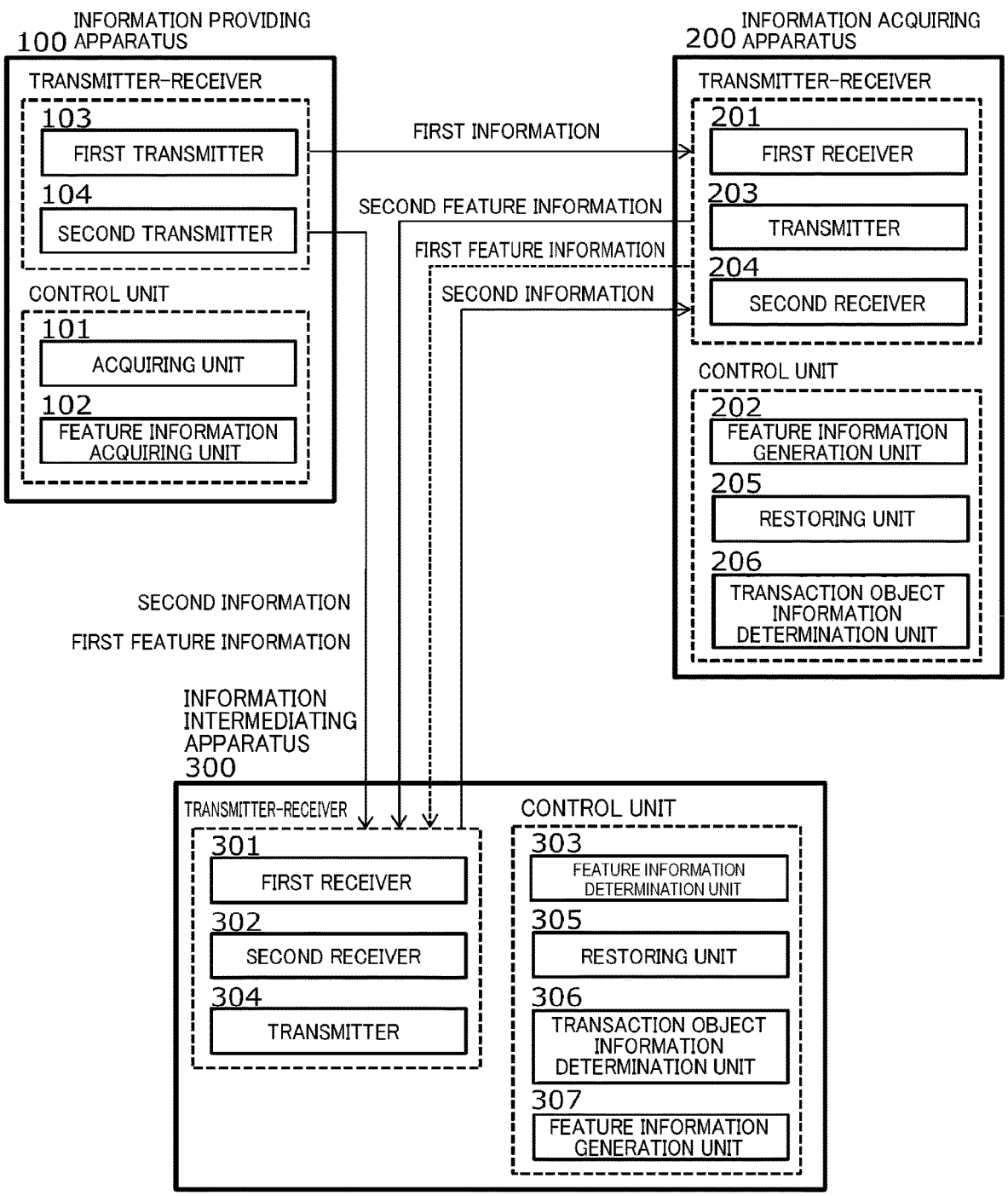
FIG. 1 is a block diagram showing an overall configuration of an information intermediating apparatus, an information providing apparatus, and an information acquiring apparatus which are common to respective embodiments of the present disclosure.

Firstly, configurations of the respective apparatuses which are common for the respective embodiments will be described as follows. FIG. 1 illustrates an information transaction system configured of an information providing apparatus 100, an information acquiring apparatus 200 and an information intermediating apparatus 300. The information providing apparatus 100, the information acquiring apparatus 200 and the information intermediating apparatus 300 (hereinafter, these three apparatuses refer to 'respective apparatuses') are mutually connected via a communication network. As the communication network, the internet is exemplified, but this is not limited thereto. For example, an intranet or a vehicle network may be utilized. The communication method may use either wireless communication or wired communication.

It is assumed that the information providing apparatus 100, the information acquiring apparatus 200 and the information intermediating apparatus 300 are configured as physically one apparatus such as a server or a personal computer. However, functions included in these apparatuses may be physically distributed into a plurality of apparatuses. Also, respective parts of each apparatus may be composed of a single apparatus or may be composed of a plurality of apparatuses. Further, a plurality of parts in each apparatus may be composed of a single apparatus. For example, in the case where a first receiver and a second receiver are present, both functions may be accomplished by a single item of hardware or software.

The configuration of the information providing apparatus will be described as follows.

The information providing apparatus 100 is configured of a control unit and a transmitter-receiver. The control unit is provided with an acquiring unit 101, and a feature information generation unit 102. The transmitter-receiver is provided with a first transmitter 103 and a second transmitter 104.

The acquiring unit 101 acquires 'first information' and 'second information' which are necessary for restoring 'transaction object information' as information of the transaction object. Specifically, for example, a cryptographic key (corresponding to 'second information' of the present disclosure) is received from other apparatus or the own apparatus generates the cryptographic key, the transaction object information is encrypted with the cryptographic key to generate the encrypted information (corresponding to 'first information' of the present disclosure). The transaction object information, corresponding to digitized information provided by the information providing apparatus and acquired by the information acquiring apparatus, may be a program or a module and the like. Further, the term 'acquiring' of the present disclosure includes a case where information is generated by calculation or the like in the acquiring unit instead of a case where information is received from outside the acquiring unit.

The feature information generation unit 102 generates 'first feature information' indicating a feature of the first information. Specifically, the feature information generation unit 102 obtains a hash value (corresponding to 'first feature information' of the present disclosure) by applying an irreversible hash function to the encrypted information.

The first transmitter 103 transmits the encrypted information encrypted by the acquiring unit 101 to the information acquiring apparatus 200.

The second transceiver 104 transmits the cryptographic key acquired by the acquiring unit 101, and the hash value obtained by the feature information generation unit 102 to the information intermediating apparatus 300.

The configuration of the information acquiring apparatus 200 will be described as follows. The information acquiring apparatus 200 is configured of a control unit and a transmitter-receiver. The transmitter-receiver is provided with a first receiver 201, a transmitter 203 and a second receiver 204. The control unit is provided with a feature information generation unit 202, a restoring unit 205 and a transaction object information determination unit 206.

The first receiver 201 is configured to receive the encrypted information (corresponding to 'first information' of the present disclosure) transmitted from the first transceiver 103 of the information providing apparatus 100.

The feature information generation unit 202 obtains 'second feature information' indicating the received first information. Specifically, the feature information generation unit 202 obtains a hash value (corresponding to 'second feature information' of the present disclosure) by applying an irreversible hash function to the encrypted information received by the first receiver 201.

The transmitter 203 transmits the hash value obtained by the feature information generation unit 202 to the information intermediating apparatus 300. Further, the transmitter 203 transmits the encrypted information (corresponding to 'first information' of the present disclosure) received by the first receiver 201, based on the determination result of the transaction object information determination unit 206 which will be described later.

The second receiver 204 receives a cryptographic key (corresponding to 'second information' of the present disclosure) from the information intermediating apparatus 300.

The restoring unit 205 restores the transaction object information from the encrypted information received by the first receiver 201 and the cryptographic key received by the second receiver 204. In other words, the encrypted information is decoded by using the cryptographic key, thereby restoring the transaction object information.

The transaction object information determination unit 206 determines whether the transaction object information restored by the restoring unit 205 is transaction object information to be provided by the information providing apparatus 100. For example, the transaction object information determination unit 206 acquires, from the information providing apparatus in advance, the catalog of the transaction object information to be provided by the information providing apparatus, utilizes the feature of the transaction object information indicated by the catalog such as types of data including image data, sound data or text data, a title of the image data, contents, reproduction time and a data size, and verifies whether the feature matches the feature of the restored transaction object information, thereby determining the transaction object information to be provided by the information providing apparatus 100. The utilized feature may be one but a plurality of features may be combined to improve the accuracy of the verification. Then, when determined that the restored transaction object information is the transaction object information to be provided, as described above, the transmitter 203 transmits the encrypted information received by the first receiver 201 to the information intermediating apparatus 300.

The configuration of the information intermediating apparatus 300 will be described as follows. The information intermediating apparatus 300 is provided with a first receiver 301, a second receiver 302, and a transmitter 304. The control unit is provided with a feature information determination unit 303, a restoring unit 305, a transaction object information determination unit 306, and a feature information generation unit 307.

The first receiver 301 receives the cryptographic key (corresponding to 'second information' of the present disclosure) transmitted from the second transmitter 104 of the information providing apparatus 100, and the hash value (corresponding to 'first feature information' of the present disclosure).

The second receiver 302 receives the hash value (corresponding to 'second feature information' of the present disclosure) transmitted from the transmitter 203. Also, the second receiver 302 receives the encrypted information (corresponding to 'first information' of the present disclosure) transmitted from the transmitter 203 of the information acquiring apparatus 200.

The feature information determination unit 303 determines 'an identity' between the hash value (corresponding to 'first feature information' of the present disclosure) received by the first receiver 301 and the hash value (corresponding to 'second feature information' of the present disclosure) received by the second receiver 302. For example, the feature information determination unit 303 compares two hash values and determines that the identity exists if the two hash values are identical (i.e. the same), and determines that no identity exists if the two hash values are not identical (i.e. not the same). Note that the determination of the identity depends on the contents and attribute of the feature information to be compared, and is not limited to the complete identity. For example, it is assumed that the feature information to be compared is configured such that hash value is assigned to predetermined upper bits and time stamp information is assigned to predetermined lower bits. The feature information determination unit 303 determines whether the predetermined upper bits are identical between two hash values, and determines, for the lower bits, whether or not the time stamp as the feature information transmitted from the information providing apparatus 100 is earlier than the time stamp as the feature information transmitted from the information acquiring unit 200. Then, when the predetermined upper bits are completely identical and the predetermined lower bits indicates that the time stamp transmitted from the information providing apparatus 100 is earlier, the feature information determination unit 303 determines the identity and other wise determines no identity. Since the feature information transmitted from the information acquiring apparatus 200 has been obtained based on the encrypted information transmitted by the information providing apparatus 100, the required time for acquiring the feature information transmitted from the information acquiring apparatus 200 is larger than the required time for acquiring the feature information transmitted directly from the information providing apparatus 100, because the feature information is transmitted via the information acquiring apparatus 200. For this reason, if the above-mentioned experience (difference between required times for acquiring) is not satisfied, it is determined that an illegal operation such as illegal rewriting may have occurred in the transaction system. Further, as another example where the identity is determined even though it is not a complete identity, a case will be described in which the data size of the feature information and the data size of the encrypted information are substantially the same. Specifically, in the case where the size of the data received by the first receiver 301 is 865 KB (kilobytes) and the size of the data received by the second receiver 302 is 864693 B (bytes), the former one is determined as a rounded value of the latter one and the system determines the identity between two values. Note that when the feature information generation unit 307 generates a hash value (corresponding to 'third information' of the present disclosure) calculated for the encrypted information transmitted from the information acquiring apparatus 200 and received by the second receiver 302, the feature information determination unit 303 compares the hash value with a hash value (corresponding to 'first feature information' of the present disclosure) received by the first receiver 301. Here, 'identity' according to the present disclosure includes a case where features of the transaction object information are the same between the first and second feature information which are different, other than a case where the first and second feature information are the same.

The transmitter 304 transmits the cryptographic key (corresponding to 'second information' of the present disclosure) to the information acquiring apparatus 200, determining that no illegal operation has occurred when the feature information determination unit 303 determines the identity.

The restoring unit 3-5 restores the transaction object information using the cryptographic key (corresponding to 'second information' of the present disclosure) received by the first receiver 301, and the encrypted information (corresponding to 'first information' of the present disclosure). In other words, the encrypted information is decoded using the cryptographic key, thereby acquiring the transaction object information.

The transaction object information determination unit 306 determines whether the transaction object information restored by the restoring unit 305 is a transaction information to be provided by the information providing apparatus 100. The method of determination is similar to that of the transaction object information determination unit 206 of the information acquiring apparatus 200.

The feature information generation unit 307 calculates the 'third feature information' indicating the feature of the first information transmitted from the information acquiring apparatus 200 and received by the second receiver 302. Specifically, for example, the feature information generation unit 307 obtains a hash value (corresponding to 'third feature information' of the present disclosure) by applying an irreversible hash function to the encrypted information received by the second receiver 302.

Operation of an information transaction system which are common for the respective embodiments will be described as follows.

Figure 2:
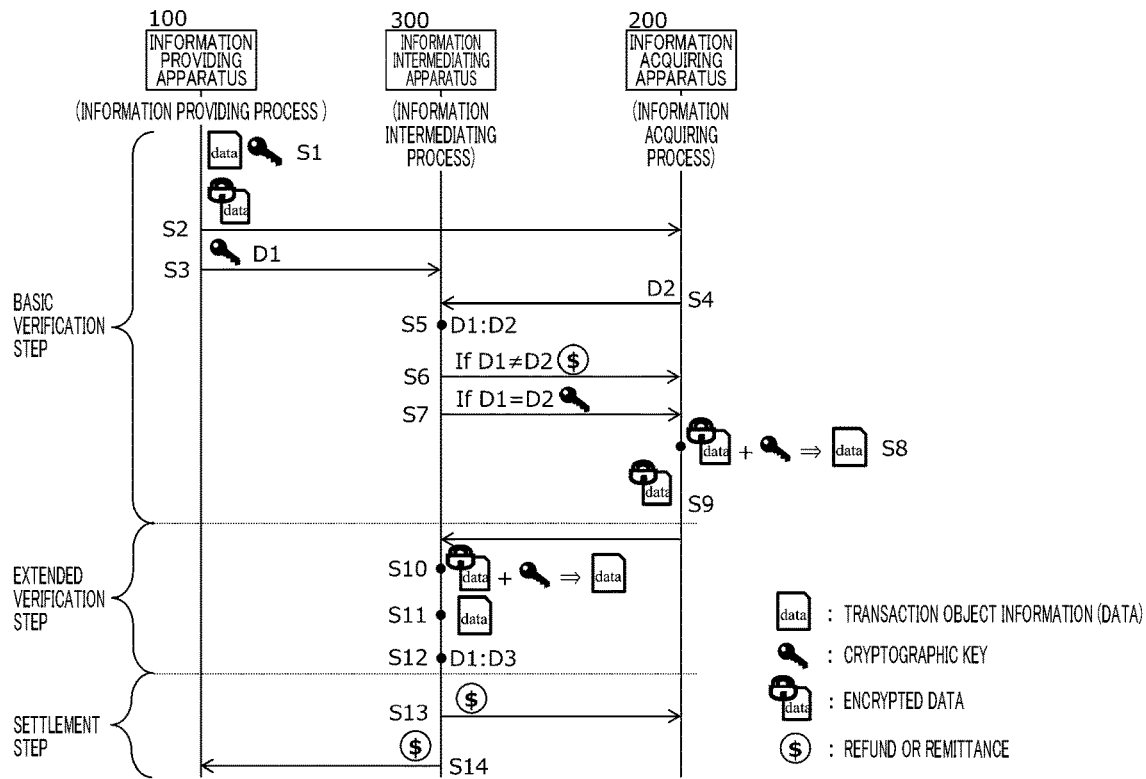
FIG. 2 is a diagram showing an operation sequence between the information intermediating apparatus, the information providing apparatus, and the information acquiring apparatus which are common for the respective embodiments.

FIG. 2 illustrates a mutual relationship based on the operations of the information providing apparatus 100 (information providing process), the information acquiring apparatus 200 (information acquiring process), and the information intermediating apparatus 300 (information intermediating process). In FIG. 2, it is assumed that the information acquiring apparatus 200 transmits a purchase request for the transaction object information, the information providing apparatus 100 transmits an acknowledge as a response, and a sales contract of the transaction objection information is concluded. The conclusion of the contract is shared by respective apparatuses. Moreover, it is assumed that the value of the transaction object information has already been paid to the information intermediating apparatus 300 from the information acquiring apparatus 200. Hereinafter, operations of the respective apparatuses will be described in the order of a basic verification step, an extended verification step and a settlement step.

The basic verification step will be described. For all of the transactions, the information intermediating apparatus 200 verifies whether the transaction object information transmitted from the information providing apparatus 100 is the same as the transaction object information acquired by the information acquiring apparatus 200. In other words, this step is to verify the validity of the transaction.

In the information providing apparatus 100, the acquiring unit 101 prepares data of the transaction object information and generates a cryptographic key for encrypting the data. Then, the acquiring unit generates the encrypted data (S1).

The information providing apparatus 100 transmits the encrypted data which has been encrypted at the acquiring unit 101 to the information acquiring apparatus 200 (S2).

The information providing apparatus 100 calculates, at the feature information generation unit 102, feature information D1 as a hash value of the encrypted data, and transmits the cryptographic key and the feature information D1 to the information intermediating apparatus 300 via the second transmitter 104 (S3).

In the information acquiring apparatus 200, the feature information generation unit 202 calculates the feature information D2 as a hash value of the encrypted data for the encrypted data received by the first receiver 201, and the transmitter 203 transmits the feature information D2 to the information intermediating apparatus 300 (S4).

The information intermediating apparatus 300 determines, at the feature information determination unit 303, an identity between the feature information D1 received by the first receiver 301 and the feature information D2 received by the second receiver 302 (S5). Then, if a condition D1=D2 is not met, the information intermediating apparatus 300 gives a refund to a person who acquired the data via the information acquiring unit 200 (S6). The information intermediating apparatus 300 transmits the cryptographic key to the information acquiring apparatus 200 via the transmitter 304 (S7), if a condition D1=D2 is met.

In the information acquiring apparatus 200, the restoring unit 205 decodes the encrypted data received by the first receiver 201 using the cryptographic key received by the second receiver 204, thereby restoring the transaction object information data (S8). Then, the transaction information determination unit 206 determines whether the restored data is data to be provided by the information providing apparatus 100. When the data is determined as a data to be provided, the process terminates the process, or sends a notification to the information intermediating apparatus 300 that the transaction is terminated. When determined that the restored data is not to be provided, the transmitter 203 transmits a notification of an accusation for an illegal operation together with the encrypted data as an evidence to the information intermediating apparatus 300 (S9). Also, only the encrypted data may be transmitted without transmitting the notification. Further, in the case where the encrypted data cannot be transmitted, only the notification of the accusation may be transmitted. In both cases, the information intermediating apparatus determines that an accusation of the illegal operation is received.

Next, the extended verification step will be described as follows.

In the extended verification step, the information intermediating apparatus 300 verifies, when receiving the accusation for illegal operation from the information acquiring apparatus 200, whether an illegal operation is present in either the information providing apparatus 100 or the information acquiring apparatus 200.

The information intermediating apparatus 300 decodes the encrypted data received by the second receiver 302 using the cryptographic key received by the first receiver 301, thereby restoring the data as the transaction object information (S10). Then, the transaction object information determination unit 306 determines whether the restored data is to be provided by the information providing apparatus 100 (S11). This step is to verify whether correct data has been transmitted to the information acquiring apparatus 200 from the information providing apparatus 100. Further, the feature information generation unit 307 calculates the feature information D3 as a hash value of the encrypted data transmitted from the information acquiring apparatus 200 and received by the second receiver 302, and determines whether an identity is present between the feature information D1 and the feature information D3 at the feature information determination unit 303 (S12). This step is for verifying whether the encrypted data transmitted to the information acquiring apparatus 200 from the information providing apparatus 100, and the encrypted data transmitted to the information intermediating apparatus 300 from the information acquiring apparatus 200 are the same.

Next, a settlement step will be described as follows. The settlement step is executed when receiving an accusation of an illegal operation from the information acquiring apparatus 100. In the settlement step, a remittance process is executed for the information providing apparatus 100 when an event of the illegal operation is present at the information acquiring apparatus 200, and a refund process is executed when an event of the illegal operation is present at the information providing apparatus 100.

When the transaction object determination unit 306 determines that the data is not to be provided (S11) and the feature information determination unit 303 determines that a condition D1=D3 (S12) is met, the information intermediating apparatus 300 determines that an event of illegal operation is present in the information providing apparatus 100, and performs a 'refund process' for 'a party that acquired the transaction object information' via the information acquiring apparatus 200 (S13). Note that 'a party that acquired the transaction object information' includes a case where a refund process is executed for another party, thereby executing a refund process indirectly for the party that acquired the transaction information, instead of a case where a refund process is executed directly for a party that acquired the transaction object information. Further, 'refund process' according to the present disclosure includes a case of commanding other apparatus to execute the refund process, other than a case where the own apparatus executes the refund process.

When the transaction object determination unit 306 determines that the data is to be provided (S11) and the feature information determination unit 303 determines that the condition D1=D3 (S12) is not met, the information intermediating apparatus 300 determines that an event of illegal operation is present in the information acquiring apparatus 200, and performs a 'remittance process' for 'a party provided the transaction object information' via the information providing apparatus 100 (S14). Moreover, in the case where the information acquiring apparatus 200 does not transmit an accusation of an illegal operation, the process determines that the transaction has completed without any errors, and performs a 'remittance process'. Note that both of 'remittance process' and 'refund process' may be executed when it is difficult to determine the cause of the illegal operation. Thus, a reliability of the transaction on the information intermediating apparatus 300 can be enhanced. Note that 'a party that provided the transaction object information' includes a case where a remittance process is executed for other party, thereby executing a remittance process indirectly for the party that acquired the transaction information, other than a case where a remittance process is executed directly for a party that acquired the transaction object information. Further, 'remittance process' according to the present disclosure includes a case of commanding other apparatus to execute the remittance process, other than a case where the own apparatus executes the remittance process.

The information transaction system which are common for the respective embodiments are described so far. Note that a portion in which a previous step does not influence the subsequent step may be changed in the order of execution. For example, the order of execution for steps S2 and S3, steps S3 and S4, and steps S11 and S12 may be exchanged.

According to the respective apparatuses which are common for the respective embodiments, in a normal transaction, since the transaction object information is not present in an available state in the information intermediating apparatus 300, a risk of information leakage from the information intermediating apparatus 300 can be reduced.

Also, when receiving the accusation of illegal operation from the information acquiring apparatus 200, that is, when an illegal operation is present in either one of the information providing apparatus 100 or the information acquiring apparatus 200, the transaction object information is gathered in the information intermediating apparatus 300. Hence, a risk of information leakage from the information intermediating apparatus 300 can be reduced.

Further, when the information acquiring apparatus 200 is determined as valid in the information intermediating apparatus 300, the information acquiring apparatus 200 is allowed to acquire the transaction object information, and the remittance process is executed for the information providing apparatus 100. Hence, an illegal information acquisition and an illegal reward can be avoided.

Then, the information intermediating apparatus 200 executes, when determined that an illegal operation is present in either the information providing apparatus 100 or the information acquiring apparatus 200, the remittance process or the refund process depending on the location where the illegal operation is conducted.

Next, an operation of the information intermediating apparatus 300 will be described.

Figure 3:
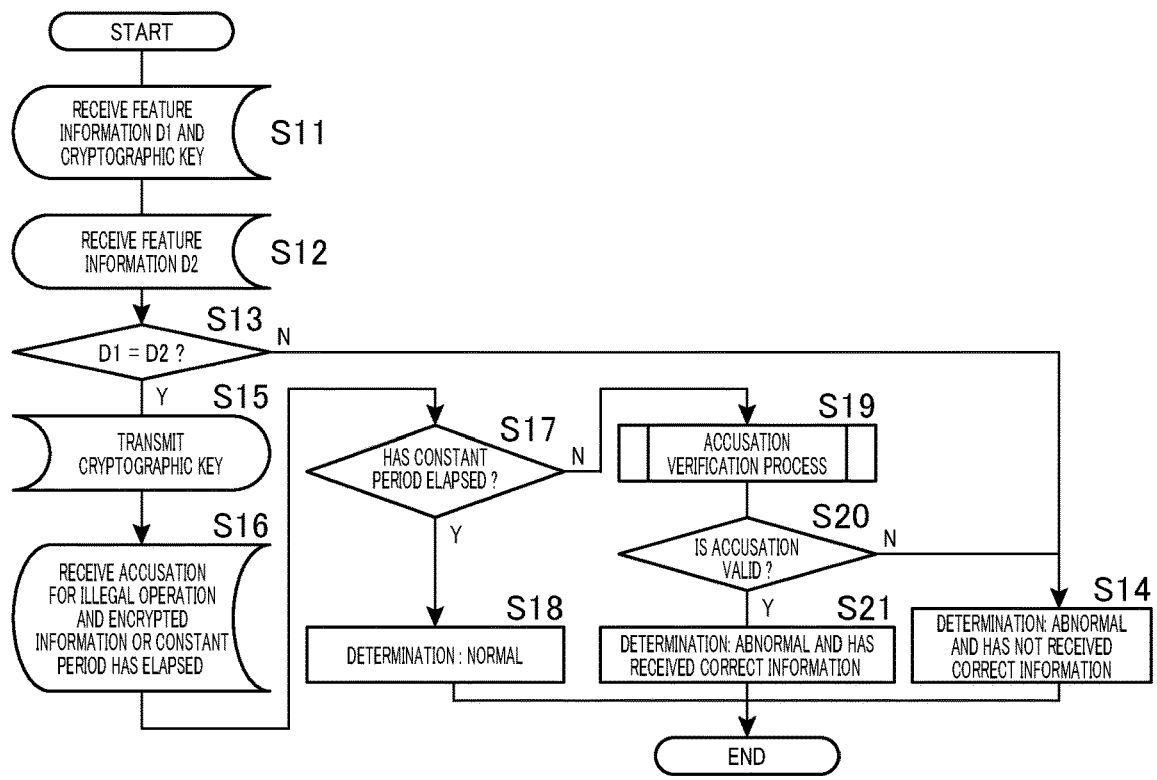
FIG. 3 is a flowchart showing an operation of a basic verification part of the information intermediating apparatus.

With reference to FIG. 3, the basic verification step will be described with a viewpoint of the information intermediating apparatus 300 as a major apparatus for the processing in the information transaction system. Note that since each step shown in FIG. 3 shows an operation of the information intermediating apparatus 300, in the description, only respective units will be quoted.

The first receiver 301 receives the feature information D1 of the encrypted information in which the transaction object information is encrypted, and the cryptographic key in which the transaction object information is encrypted, from the information providing apparatus 100 (S11).

The second receiver 302 receives the feature information D2 of the encrypted information calculated in the information acquiring unit 200 (S12). In the case where the feature information D1 has not been received for a constant period from the information acquiring unit 200, the process may determine that the transaction has not completed properly (is abnormal), and proceeds to step S14 which will be described later.

The feature information determination unit 303 compares the feature information D1 received at step S11 and the feature information D2 received at step S12 (S13). If the condition D1=D2 is not met, the process proceeds to step S14 and if the condition D1=D2 is met, the process proceeds to step S15.

If the condition D1=D2 is not met (S13:N), the process determines that the transaction has not completed properly (abnormal), and determines that the information acquiring apparatus 200 has not received correct transaction object information (S14). Then, the process may execute related processes such as a refund process.

The process transmits the cryptographic key to the information acquiring apparatus 200 (S15), when the condition D1=D2 is met (S13:Y).

In the case where an accusation of illegal operation is issued because a predetermined transaction object information cannot be restored from the information acquiring apparatus 200 and encrypted information as evidence is received from the information acquiring apparatus 200, or a constant period has elapsed without receiving any notification from the information acquiring apparatus 200, the process proceeds to step S17 (S16).

Subsequently, the process determines whether a constant period has elapsed from a time when the cryptographic key is transmitted at step S15 (S17). When determined that a constant period has elapsed (S17:Y), the process determines that no accusation has been issued, and the transaction has completed properly (Normal) (S18). When the process determines that a constant period has not elapsed (S17: N), the process proceeds to an accusation verification process (S19).

As a result of the accusation verification process, when the accusation is valid (S20:Y), the process determines that the transaction has not completed properly (is abnormal), and determines that the information acquiring apparatus 200 has not received the correct transaction object information (S14). Then, the process may execute related processes such as a refund process to a party acquired the transaction object information via the information acquiring apparatus 200, for example.

As a result of the accusation verification process, if the accusation is invalid (S20: N), the process determines that the transaction has not completed properly (abnormal), and determines that the information acquiring apparatus 200 may have received the correct transaction object information (S21). Then, the process may execute related processes such as a remittance process to a party provided the transaction object information via the information providing apparatus 100, for example.

Figure 4:
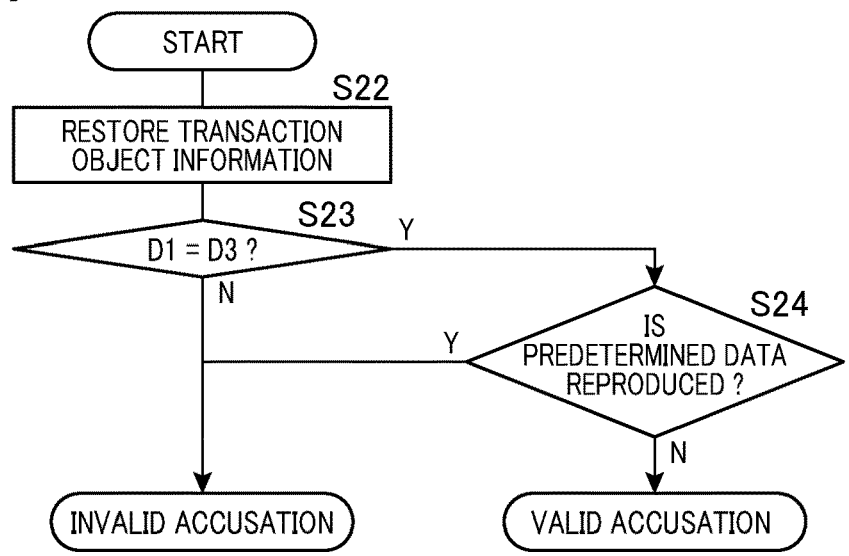
FIG. 4 is a flowchart showing an operation of an extended verification part of the information intermediating apparatus.

With reference to FIG. 4, a subroutine of the accusation verification process as the extended verification step will be described.

The restoring unit 305 restores the transaction object information from the cryptographic key received by the information providing apparatus 100 and the encrypted information received by the information acquiring apparatus 200 (S22).

The feature information generation unit 307 calculates the feature information D3 indicating a feature of the encrypted information received by the information acquiring apparatus 200. Then, the feature information determination unit 303 determines whether an identity is present between the feature information D1 and the feature information D3 (S23). If the condition D1=D3 is not met (S23:N), the process determines that the accusation is invalid and proceeds to step S24.

The transaction object information determination unit 306 determines whether the transaction object information restored in the restoring unit 305 is to be provided by the information providing apparatus 100 (S24). When determined that the transaction object information is to be provided (S24:Y), the accusation is determined as invalid. When determined that the transaction object information is not to be provided (S24:N), the accusation is determined as valid. Since steps S23 and S24 do not depend on a result of the other step in the determination, the order of determination may be exchanged. However, the determination results for the combination of steps S23 and S24 will be as follows.

S23 (Y) and S24 (Y): accusation is invalid
S23 (Y) and S24 (N): accusation is valid
S23 (N) and S24 (Y): accusation is invalid
S23 (N) and S24 (N): accusation is invalid Therefore, if the determination result at step S23 is not D1=D3 (S23 (N)), the accusation is necessarily invalid and the determination at step S24 is unnecessary. Hence, the calculation cost can be lowered with the determination using the order shown in FIG. 4

The operations of the information intermediating apparatus 300 is described so far. Similarly, the operations of the information acquiring apparatus 200 and the information providing apparatus 100 can be determined based on FIGS. 2 and 3.

The common configurations and operations for the respective embodiments are described so far. The above description is an example where the present disclosure is embodied. However, the present disclosure may be embodied with the following means and methods, taking the technical scope of the present disclosure into consideration.

The 'first information' and 'second information' of the present disclosure are necessary for restoring the 'transaction object information'. Hence, as long as the 'transaction object information' can be restored using both the first information and second information, any combinations are possible.

As the 'first information', encrypted information in which the transaction object information is encrypted, and as the 'second information', a cryptographic key used for encrypting the transaction object information are exemplified in the foregoing description. However, these items of information can be switched. Instead, as the 'first information', a cryptographic key used for encrypting the transaction object information may be used, and as the 'second information' a temporal key used for encrypting the cryptographic key may be used, or these keys may be exchanged. Also in this case, the cryptographic key and the temporal key are necessary for restoring the transaction object information. In other words, these keys are in complementary relationship in which both keys are required at the same time to restore the transaction object information.

Also, a part of the transaction object information may be used as the 'first information', and a remaining part of the transaction object information may be used as the 'second information'. In this case, the transaction object information may be simply divided by two, but may be divided randomly into segments (a comb-like shape), or randomly arranged. In this case, data indicating a rule of division and arrangement may be added to either 'first information' or 'second information' or added to both 'first information' and 'second information'. Alternatively, the data may be divided and each of the divided data may be added to respective 'first information' and 'second information'.

Further, as the 'first information' and 'second information', a share in which the transaction object information is divided by using a secret sharing scheme may be used.

The 'first feature information', the 'second feature information', and 'third feature information' of the present disclosure each indicates the 'first information' of the present disclosure, and are each calculated in the information providing apparatus, the information acquiring apparatus and the information intermediating apparatus, respectively. Either 'feature information' is required to have at least the feature of 'first information', including an irreversible (one direction) hash function described above, a data size, a data size after being compressed with a specific algorithm, MAC (message authentication code) value, and a stored date, for example. Moreover, some of these items may be combined or other information such as time stamp may be added thereto. The feature information may preferably be information having high anti-collision properties.

The 'transaction object information' of the present disclosure may be at least information to be an object of the transaction, including an image data, a sound data, a text data, and a program, and any types of data may be used.

The cryptographic key of the present disclosure is expected to use a temporal key, but it is not limited thereto. The name of key is not limited. Any name of keys can be used such as a key, a secret key, a dedicated key, a password, and a release key.

First Embodiment

Figure 5:
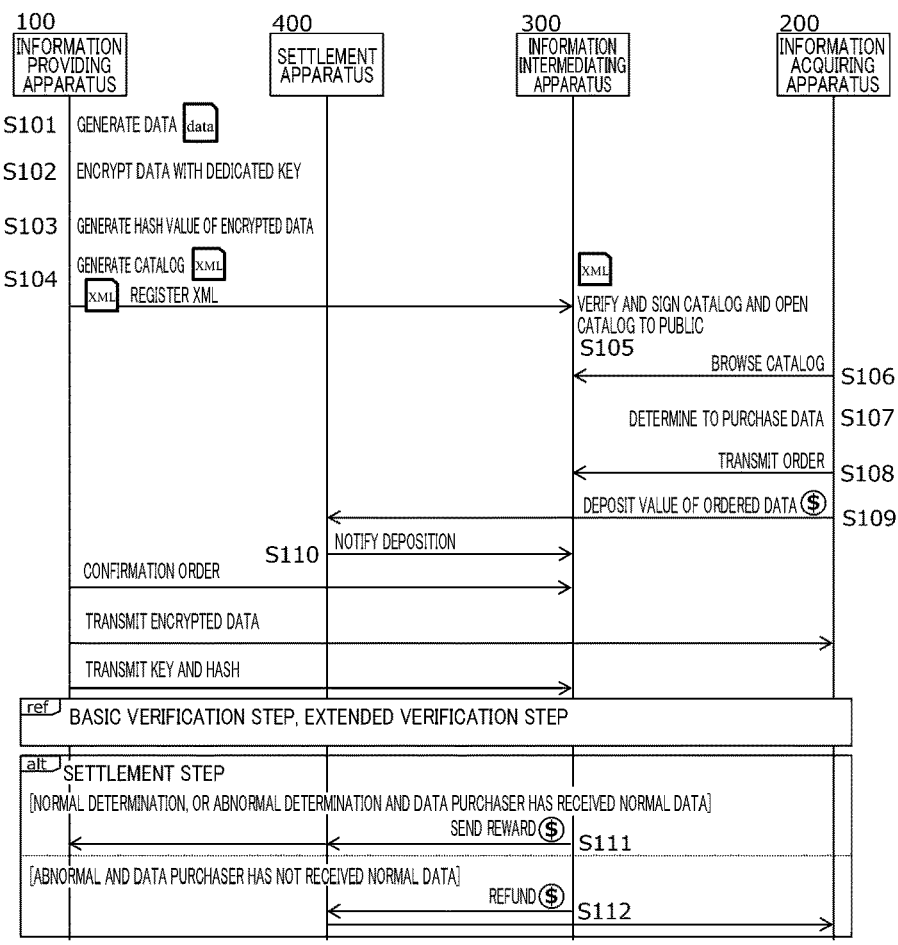
FIG. 5 is a diagram showing an operation sequence between respective apparatuses according to a first embodiment of the present disclosure.

As a specific example of the present disclosure, embodiments of the present disclosure will be described. With reference to FIG. 5, operation of the respective apparatuses of the first embodiment will be described. According to the first embodiment, the following functions are added to the operations of respective apparatuses using FIG. 2. The functions include a generation of a catalog in the information providing apparatus 100, a transmission of the catalog to the information intermediating apparatus 300, and a presence of a settlement unit 400. The explanation for steps which are already described with FIG. 2 will be omitted.

According to the first embodiment, the information providing apparatus 100 as a data provider generates data as the transaction object information (S101), and generates an encrypted data in which the data is encrypted using a dedicated key (S102) to calculate a hash value of the encrypted data (S103). Then, the information providing apparatus 100 generates a catalog of the data which is the transaction object information, and transmits the catalog to the information intermediating apparatus 300 as an intermediary, thereby registering them (S104). The catalog is stored, for example, as XML file including data which the information providing apparatus 100 is able to provide. For example, the XML file stores the feature of the data including types of data (sound, image or the like), title, abstract of the contents, play time, price.

The information intermediating apparatus 300 verifies/signs the catalog transmitted from the information providing apparatus 200, and opens the catalog to the public (S105).

The information acquiring apparatus 300 as the data purchaser accesses the information intermediating apparatus 300 to browse the catalog (S106), and determines to purchase the specific data among them (S107), and transmits the order information (S108). Then, the process deposits the value of the ordered data to the settlement unit 400 as a settlement dealer (S109). The deposit is performed by transmitting information of a credit card such as the credit card number or the card holder name.

The settlement apparatus 400 received the deposit of the data value notifies the information intermediating apparatus 300 of reception of the data value (S110). Further, the information intermediating apparatus 300 may notify the information providing apparatus 100 of reception of the order or the deposit.

The processes executed after the foregoing processes are the same as those after the process at step S2 shown in FIG. 2. In other words, the basic verification step, the extended verification step and the settlement step are executed in this order. Note that the remittance process (S111) and the refund process (S112) performed by the information intermediating apparatus 300 are performed via the settlement unit 400.

According to the respective apparatuses, order and approval for selling/purchasing of specific data using the catalog can be accomplished on the system. Also, since the settlement operation utilizes the settlement unit 400, the intermediation and the settlement of the information can be performed separately in different apparatuses.

Second Embodiment

Figure 6:
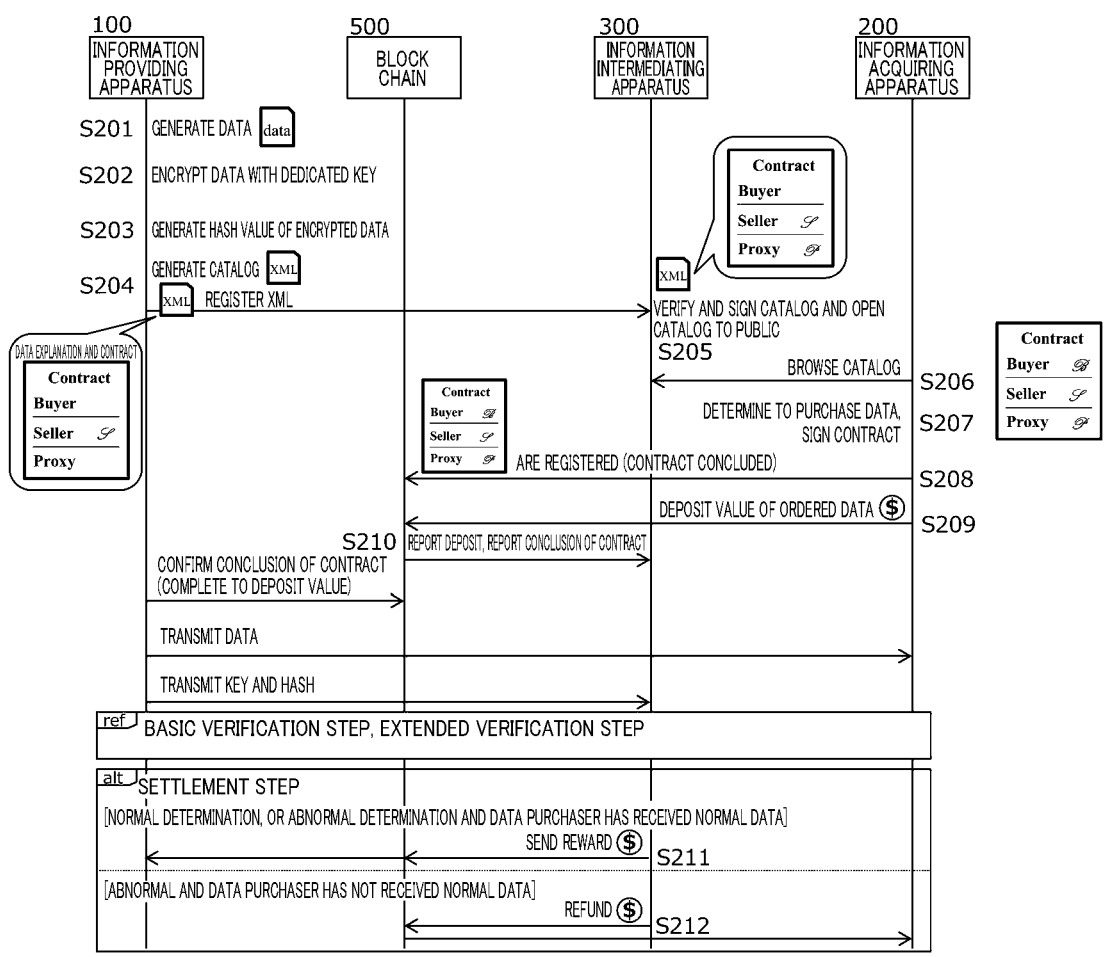
FIG. 6 is a diagram showing an operation sequence between respective apparatuses according to a second embodiment of the present disclosure.

With reference to FIG. 6, the operations of respective apparatuses of the second embodiment will be described. The second embodiment differs from the first embodiment in that the contract is attached to the catalog, and a blockchain unit 500 is provided between the apparatuses, instead of the settlement dealer.

The steps from S201 to S203 are the same as steps S101 to S103 of the first embodiment shown in FIG. 5. The information providing apparatus 100 generates the catalog of data as the transaction object information, and transmits the generated catalog to the information intermediating apparatus 300 as an intermediary, thereby registering them (S204). The catalog has a format including signatures of the seller, the purchaser and a mediator in addition to the transaction object information, information identifying the price as a contract. The information providing apparatus 100 signs on the column of the seller and transmits the catalog to the information intermediating apparatus 300 and registers them into the information intermediating apparatus 300.

The information intermediating apparatus 300 signs on the column of the mediator in the contract attached to the catalog transmitted from the information providing apparatus 100, and then opens the catalog to the public (S205).

The information acquiring apparatus 300 which is a data purchaser accesses the information intermediating apparatus 300, browses the catalog (S206), determines to purchase the specific data, signs on the column of the seller on the contract (S207), and transmits the contract to the block chain 500 (S208). Then, the process deposits the value of the ordered data to the block chain 500 (S209). The block chain refers to distributed ledger technology having a consensus function for retaining the same contents in the respective nodes.

The block chain 500 which received the contract and deposit of the value of the data notifies the information intermediating apparatus 300 of reception of the contract and a deposit of the value (S210), in response to an inquiry from the information intermediating apparatus 300. Also, the information intermediating apparatus 300 may notify the information providing apparatus 100 of reception of the order and the deposit as needed.

The subsequent processes are the same as those in the first embodiment shown in FIG. 5.

According to the respective apparatuses, in addition to effects obtained by the first embodiment, the following effects can be obtained. Since the block chain is used, without constructing a database dedicated for the information providing apparatus as a data provider, the contract can be managed and the settlement can be accomplished.

Third Embodiment

Figure 7:
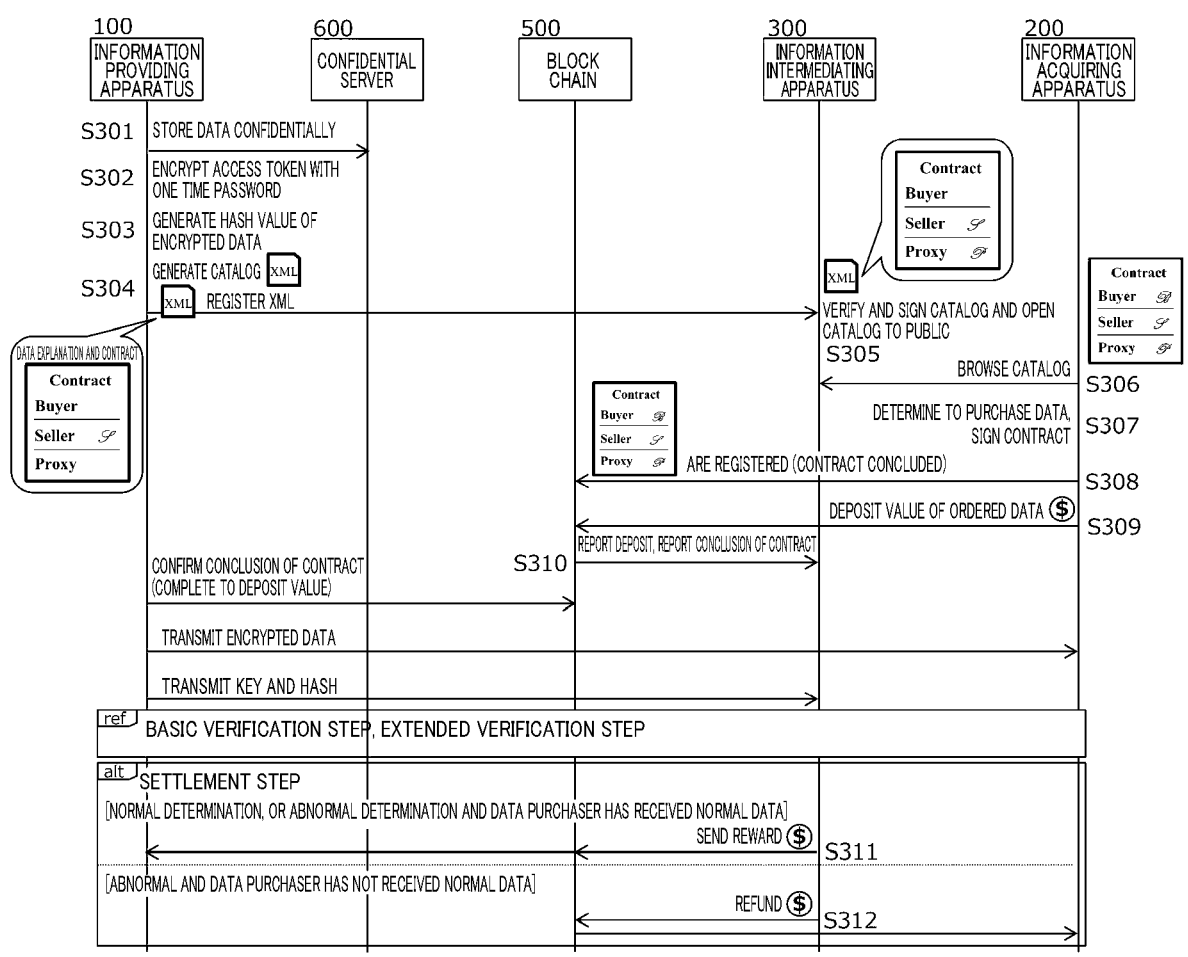
FIG. 7 is a diagram showing an operation sequence between respective apparatuses according to a third embodiment of the present disclosure.

With reference to FIG. 7, operations of the respective apparatuses of the third embodiment will be described. The third embodiment differs from the second embodiment in that the transaction object information is stored in a confidential server 600, and a token (i.e. access token) is used to access the secure server 600.

The information providing apparatus 100 as the data provider stores the data as the transaction object information to the secure server (S301). The access token for the secure server 600 is encrypted with a temporal key (S302), and calculates a hash value of the encrypted data (S303). In other words, according to the third embodiment, the 'first information' of the present disclosure is determined as encrypted data in which the access token is encrypted with a temporal key, and the 'second information' is determined as a hash value of the encrypted data.

Steps S304 to S310 are the same as steps S204 to S210 of the second embodiment shown in FIG. 6.

The information acquiring apparatus 200 accesses the secure server restored access token and acquire the data as the transaction object information.

In addition to the effects obtained from the second embodiment, according to the respective apparatuses of the third embodiment, a risk of information leakage is more likely to be reduced, since the data as the transaction object information is received/transmitted via the secure server 600. Since the data transmitted/received via the information intermediating apparatus 300 is only an encrypted key or a hash value, the communication can be accomplished without affecting the network bandwidth. Further, the secure server 600 is provided, whereby the information acquiring apparatus 200 is able to acquire the transaction object information data in a real time manner even when the information providing apparatus 100 is offline.

Next, configurations of respective apparatuses and information transaction system will be described.

Each of the information providing apparatus 100, the information acquiring apparatus 200 and the information intermediating apparatus 300 may be configured of an information processing apparatus provided with a CPU (central processing unit), and a volatile memory unit such as a RAM (random access memory). In this case, the information processing apparatus may further include a non-volatile memory unit such as a flash memory, an external memory unit such as hard disk, a network interface connected to a communication network or the like. Moreover, such an information processing apparatus may be embodied in a finished product such as a server, a workstation, a personal computer, a car navigation system, a portable information terminal such as a smart phone or a tablet terminal, and a cellular phone. Further, the information processing apparatus may be embodied by a packaged semiconductor device, a system board or a substrate on which a plurality of semiconductor chips and other components are mounted.

According to the above-described embodiments, it is assumed that the respective apparatuses of the information providing apparatus 100, the information acquiring apparatus 200, the information intermediating apparatus 300 are configured by mainly a server or a personal computer and these apparatuses are connected by the internet. However, the present disclosure is not limited thereto. For example, in the case where these apparatuses are mounted on a vehicle, the following configurations may be possible.

Figure 8:
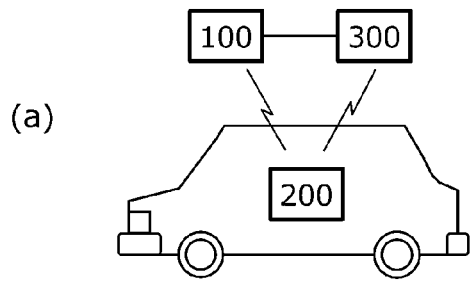
FIG. 8 is a diagram showing various configurations of the respective apparatuses and implementation examples.
Figure 8:
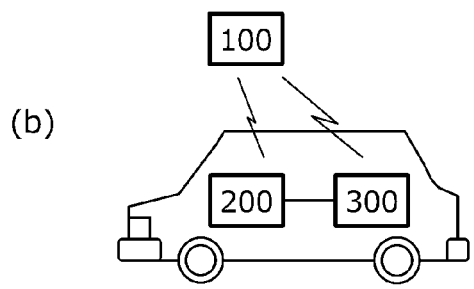
Figure 8:
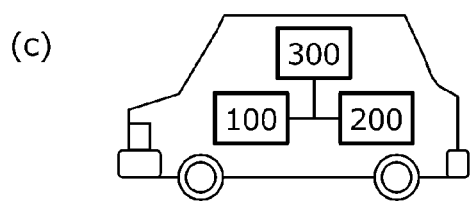
Figure 8:
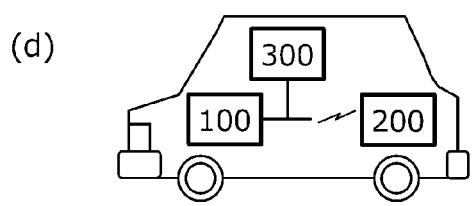
Figure 8:
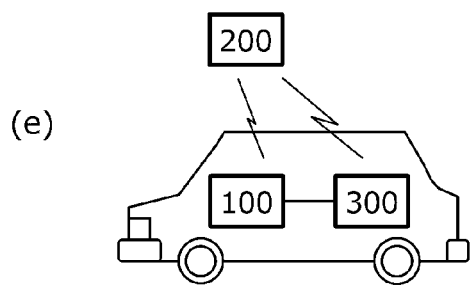

FIG. 8 illustrates a case where the respective apparatuses are mounted on a vehicle such as a car. FIG. 8 (*a*) illustrates an example in which the information providing apparatus 100 and the information intermediating apparatus 300 are provided outside the vehicle, and the information acquiring apparatus 200 is provided in the vehicle. In this case, usually, the information providing apparatus 100 and the information intermediating apparatus 300 are wired-connected using the internet or the like, and these apparatuses and the information acquiring apparatus are connected by wireless-communication. For example, the information providing apparatus 100 and the information intermediating apparatus 300 may be configured as a server, the information acquiring apparatus 200 may be configured as a car navigation system, or a portable information terminal. In these configurations, as the transaction object information, an image data and a sound data or the like are assumed.

FIG. 8 (*b*) illustrates an example in which the information providing apparatus 100 is provided outside the vehicle, and the information intermediating apparatus 300 and the information acquiring apparatus 200 are provided in the vehicle 200. In this case, the information providing apparatus 100 and the information acquiring apparatus 200 are assumed to be connected with a network using various network protocols such as a controller area network (CAN) or a local interconnect network (LIN) other than a known ethernet (registered trade mark) protocol. For example, the information providing apparatus 100 may be configured as a server, and the information intermediating apparatus 300 or the information acquiring apparatus 200 may be configured as electronic control unit (ECU) or a car navigation system. Also, in this case, as the transaction object information, vehicle control information and a vehicle control program which control the driving system of the vehicle are assumed.

FIG. 8 (*c*) illustrates an example in which all of the information providing apparatus 100, the information intermediating apparatus 300 and the information acquiring apparatus 200 are provided in the vehicle. In this case, respective apparatuses are assumed to be connected with a network using various protocols such as CAN, LIN or the like, other than the known ethernet (registered trade mark) protocol. For example, the respective apparatuses may be configured as ECU. Also, in this case, as the transaction object information, vehicle control information which controls the driving system of the vehicle is assumed. Note that as shown in FIG. 8 (*d*), the information acquiring apparatus 200 may be configured as a car navigation system or a portable information terminal. In this case, as the transaction object information, a vehicle control information or the like is assumed, and the driver of the vehicle is able to confirm an operational state of each part of the vehicle through the screen.

FIG. 8 (*e*) illustrates an example in which the information acquiring apparatus 200 is provided outside the vehicle, and the information intermediating apparatus 300 and the information providing apparatus 100 are provided in the vehicle. In this case, the information providing apparatus 100 and the information intermediating apparatus 300 are assumed to be connected with a network using CAN or LIN protocol, other than known ethernet (registered trade mark) protocol. Further, the information acquiring apparatus 200 and other apparatuses are connected by a wireless-communication. For example, the information acquiring apparatus 200 may be configured as a server, the information intermediating apparatus 300 and the information providing apparatus 100 may be configured as ECU. Also, in this case, as the transaction object information, vehicle control information which controls the driving system of the vehicle is assumed. For example, in the case where a state of driving of the vehicle is reported to the information acquiring apparatus 200, the state of driving of the vehicle is transmitted to the information acquiring apparatus 200 via the information intermediating apparatus 300.

The respective apparatuses may have configurations other than those shown in FIG. 8.

In the foregoing embodiments, features of the respective apparatuses are described.

Since the terms used in the foregoing embodiments are example, the terms may be substituted by other synonymous terms or terms having synonymous function.

The block diagrams used for explaining the embodiments are composed of configurations of respective apparatuses which are sorted and arranged for each function. These functional blocks are accomplished by any combinations of hardware or software. Since these block diagrams show functions, these block diagrams can be recognized as a disclosure of a method of the invention.

For the processes, flowcharts, and functional blocks to be recognized as methods which are described in the respective embodiments, execution order thereof can be reordered as long as a relationship is not present between steps in which a result of one step is used in other steps.

The terms 'first' and 'second' used through respective embodiment and claims are used to distinct the same type of constituents or methods, and are not used to limit the order and superiority or inferiority. Further, these terms do not refer to necessarily the same component, but may refer to the same component.

The present disclosure is not only accomplished by hardware having the constituents and functions described in the embodiments, but may be accomplished by a combination of a program stored in a recording media such as a memory device, a hard disk and a non-transitory computer readable media, and a hardware including a dedicated CPU or a CPU capable of executing the program.

The program stored in a dedicated or a regular recording media (external memory devices such as hard disk, USB memory, CD (compact disc), BD (Blu-ray disk)), or in an internal memory unit (RAM, ROM or the like) can be provided to a dedicated or regular hardware via the recording media, or via the server through a communication line. Thus, the program can be maintained to be the latest by updating the program with the server.

The usage of the information providing apparatus, the information acquiring apparatus and the information intermediating apparatus, and the information transaction system using these apparatuses are not limited. In the above-described embodiments, the apparatuses and the system are exemplified as trade of information, a management of vehicle information on the on-vehicle ECU or the like. However, the apparatuses and the system may be utilized for automatic updating of the program or a communication (V2X) between a road side unit and an on-vehicle equipment.

The information apparatus according to the present disclosure is described so far.

In a conventional art, for example, according the above-described technique in the background part, public contents provided/deposited by a service provider are stored in a multifunctional authentication center as an intermediating apparatus, and distributed to the user in response to an order by the user. However, in the case where contents are centralized in the multifunctional authentication center as the intermediating apparatus, the risk of leaking the public contents may increase when the multifunctional authentication center is attacked.

In this regard, the present disclosure provides an intermediating apparatus that reduces a risk of information leakage from the intermediating apparatus. The information intermediating apparatus according to the present disclosure is configured as an information intermediating apparatus in an information transaction system that is composed of an information providing apparatus, an information acquiring apparatus and the information intermediating apparatus which are connected to a communication network. The information intermediating apparatus is provided with a first receiver that receives second information from among first and second information which are necessary for restoring transaction object information, and first feature information indicating a feature of the first information; a second receiver that receives second feature information from the information acquiring apparatus, the second feature information being calculated from the first information transmitted to the information acquiring apparatus from the information providing apparatus; a feature information determination unit that determines whether an identity is present between the first feature information and the second feature information; and a transmitter that transmits the second information to the information acquiring apparatus, when the feature information determination unit determines that the identity is present between the first feature information and the second feature information.

According to the information intermediating apparatus, the information providing apparatus and the information acquiring apparatus, since the information intermediating apparatus does not include the transaction object information in an available state, a risk of information leakage from the information intermediating apparatus can be extremely small.

What is claimed is:

1. An information intermediating apparatus in an information transaction system that is composed of an information providing apparatus, an information acquiring apparatus and the information intermediating apparatus which are connected to a communication network, the information intermediating apparatus comprising:
 a first receiver that receives second information from among first and second information which are necessary for decoding and restoring transaction object information by the information acquiring apparatus, and first feature information indicating a feature of the first information;
 a second receiver that receives second feature information from the information acquiring apparatus, the second feature information being calculated from the first information, the first information being transmitted to the information acquiring apparatus from the information providing apparatus;
 a feature information determination unit that determines whether an identity is present between the first feature information and the second feature information; and
 a transmitter that transmits the second information to the information acquiring apparatus, when the feature information determination unit determines that the identity is present between the first feature information and the second feature information, wherein
 the information intermediating apparatus does not store the transaction object information.

2. The information intermediating apparatus according to claim 1, wherein
 the first information is encrypted information in which the transaction object information is encrypted; and
 the second information is a cryptographic key which is used for encrypting the second information.

3. The information intermediating apparatus according to claim 1, wherein
 the first information is a part of the transaction object information; and
 the second information is a remaining part of the transaction object information.

4. The information intermediating apparatus according to claim 1, wherein
 the first information and the second information are configured as a share in which the transaction object information is divided by using a secret sharing scheme.

5. The information intermediating apparatus according to claim 1, wherein
 Each of the first feature information and the second feature information is a hash value calculated from the first information using an irreversible hash function.

6. The information intermediating apparatus according to claim 1, wherein
 the first feature information and the second feature information is a data size of the first information.

7. The information intermediating apparatus according to claim 1, wherein
 the second receiver is configured to further receive the first information from the information acquiring apparatus;
 the information intermediating apparatus further comprising a feature information generation unit that calculates third feature information indicating a feature of the first information; and
 the feature information generation unit is configured to determine whether an identity is present between the first feature information and the third feature information.

8. A method for intermediating information executed in an information intermediating apparatus in an information transaction system that is composed of an information providing apparatus, an information acquiring apparatus and the information intermediating apparatus which are connected to a communication network,
 the method comprising steps of:
 receiving second information from among first and second information which are necessary for decoding and restoring transaction object information by the information acquiring apparatus, and first feature information indicating a feature of the first information;
 receiving second feature information from the information acquiring apparatus, the second feature information being calculated from the first information transmitted to the information acquiring apparatus from the information providing apparatus;
 determining whether an identity is present between the first feature information and the second feature information; and
 transmitting the second information to the information acquiring apparatus, in response to determining that the identity is present between the first feature information and the second feature information, wherein
 the information intermediating apparatus does not store the transaction object information.

9. A program stored in a non-transitory computer readable media executed in an information intermediating apparatus in an information transaction system that is composed of an information providing apparatus, an information acquiring apparatus and the information intermediating apparatus which are connected to a communication network,
 the program comprising steps of:
 a first receiving step of receiving second information from among first and second information which are necessary for decoding and restoring transaction object information by the information acquiring apparatus, and first feature information indicating a feature of the first information;
 a second receiving step of receiving second feature information from the information acquiring apparatus, the second feature information being calculated from the first information transmitted to the information acquiring apparatus from the information providing apparatus;
 a determining step of determining whether an identity is present between the first feature information and the second feature information; and
 a transmitting step of transmitting the second information to the information acquiring apparatus, in response to determining that the identity is present between the first feature information and the second feature information, wherein
 the information intermediating apparatus does not store the transaction object information.

10. An information providing apparatus in an information transaction system that is composed of the information providing apparatus, an information acquiring apparatus and an information intermediating apparatus which are connected to a communication network, the information providing apparatus comprising:
- an acquiring unit that acquires first information and second information which are necessary for decoding and restoring transaction object information by the information acquiring apparatus;
- a feature information generation unit that generates first feature information indicating a feature of the first information;
- a first transmitter that transmits the first information to the information acquiring apparatus; and
- a second transmitter that transmits the second information and the first feature information to the information intermediating apparatus, wherein
- the information intermediating apparatus does not store the transaction object information.

11. A method for providing information executed in an information providing apparatus in an information transaction system that is composed of the information providing apparatus, an information acquiring apparatus and an information intermediating apparatus which are connected to a communication network,
the method comprising steps of:
- acquiring first information and second information which are necessary for decoding and restoring transaction object information by the information acquiring apparatus;
- generating first feature information indicating a feature of the first information;
- transmitting the first information to the information acquiring apparatus; and
- transmitting the second information and the first feature information to the information intermediating apparatus, wherein
- the information intermediating apparatus does not store the transaction object information.

12. A program, stored in a non-transitory computer readable media, executed in an information providing apparatus in an information transaction system that is composed of the information providing apparatus, an information acquiring apparatus and an information intermediating apparatus which are connected to a communication network,
the program comprising steps of:
- an acquiring step of acquiring first information and second information which are necessary for decoding and restoring transaction object information by the information acquiring apparatus;
- a generating step of generating first feature information indicating a feature of the first information;
- a first transmitting step of transmitting the first information to the information acquiring apparatus; and
- a second transmitting step of transmitting the second information and the first feature information to the information intermediating apparatus, wherein
- the information intermediating apparatus does not store the transaction object information.

13. An information acquiring apparatus in an information transaction system that is composed of an information providing apparatus, the information acquiring apparatus and an information intermediating apparatus which are connected to a communication network, the information acquiring apparatus comprising:
- a first receiver that receives first information from among first and second information which are necessary for decoding and restoring transaction object information by the information acquiring apparatus;
- a feature information generating unit that generates second feature information indicating a feature of the first information;
- a transmitter that transmits the second feature information to the information intermediating apparatus;
- a second receiver that receives the second information from the information intermediating apparatus; and
- a restoring unit that decodes and restores the transaction object information from the first information and the second information, wherein
- the information intermediating apparatus does not store the transaction object information.

14. The information acquiring apparatus according to claim 13, wherein
- the information acquiring apparatus further comprises a transaction information determination unit that determines whether the transaction object information decoded and restored by the restoring unit is transaction object information to be provided by the information providing apparatus;
- the transmitter is configured to transmit the first information to the information intermediating apparatus, when the transaction information determination unit determines that an identity is not present.

15. A method for acquiring information executed in an information acquiring apparatus in an information transaction system that is composed of an information providing apparatus, the information acquiring apparatus and an information intermediating apparatus which are connected to a communication network,
the method comprising steps of:
- receiving first information from among first and second information which are necessary for decoding and restoring transaction object information by the information acquiring apparatus;
- generating second feature information indicating the first information;
- transmitting the second feature information to the information intermediating apparatus;
- receiving the second information from the information intermediating apparatus; and
- decoding and restoring the transaction object information from the first information and the second information, wherein
- the information intermediating apparatus does not store the transaction object information.

16. A program stored in a non-transitory computer readable media executed in an information acquiring apparatus in an information transaction system that is composed of an information providing apparatus, the information acquiring apparatus and an information intermediating apparatus which are connected to a communication network,
the program comprising steps of:
- a first receiving step of receiving first information from among first and second information which are necessary for decoding and restoring transaction object information by the information acquiring apparatus;
- a generating step of second feature information indicating the first information;
- a transmitting step of transmitting the second feature information to the information intermediating apparatus;

a second receiving step of receiving the second information from the information intermediating apparatus; and a restoring step of decoding and restoring the transaction object information from the first information and the second information, wherein the information intermediating apparatus does not store the transaction object information.

\* \* \* \* \*